(12) United States Patent
Naito (10) Patent No.: US 9,149,766 B2
(45) Date of Patent: Oct. 6, 2015

(54) COMPRESSOR IMPURITY-REMOVAL SYSTEM

(71) Applicant: IHI CORPORATION, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 14/663,520

(22) Filed: Mar. 20, 2015

(65) Prior Publication Data

US 2015/0190752 A1     Jul. 9, 2015

Related U.S. Application Data

(63) Continuation of application No. PCT/JP2013/005971, filed on Oct. 8, 2013.

(30) Foreign Application Priority Data

Oct. 9, 2012 (JP) .................................. 2012-223819

(51) Int. Cl.
*B01D 53/00* (2006.01)
*F25J 1/00* (2006.01)
(Continued)

(52) U.S. Cl.
CPC .............. *B01D 53/75* (2013.01); *B01D 53/002* (2013.01); *B01D 53/346* (2013.01); *F25J 1/0027* (2013.01)

(58) Field of Classification Search
CPC .... B01D 53/002; B01D 53/75; B01D 53/346; F25J 1/0027
USPC .............................. 422/168, 169; 62/606, 617
See application file for complete search history.

(56) References Cited

U.S. PATENT DOCUMENTS 9,011,808 B2 *   4/2015   Schodel et al. ................ 423/220
2008/0184880 A1   8/2008   Fan et al.
(Continued)

FOREIGN PATENT DOCUMENTS

JP      2010-507773 A      3/2010
JP      2010-172878 A      8/2010
(Continued)

OTHER PUBLICATIONS

International Search Report mailed Jan. 28, 2014 in International Application No. PCT/JP2013/005971 filed Oct. 8, 2013 (in English only).

(Continued)

*Primary Examiner* — Jill Warden
*Assistant Examiner* — Joye L Woodard
(74) *Attorney, Agent, or Firm* — Oblon, McClelland, Maier & Neustadt, L.L.P.

(57) ABSTRACT

Impurities in exhaust gas from oxyfuel combustor are removed using simple equipment to reduce installation cost. Compressor-based impurity removal system for compressing exhaust gas mainly composed of carbon dioxide from combustor before supply to carbon dioxide liquefier for removal of impurities in exhaust gas has impurity separators with compressors for compressing exhaust gas from combustor stepwisely to target pressure for liquefaction of carbon dioxide and with aftercoolers for cooling exhaust gas compressed by compressors, water condensed by cooling being discharged as drain, and alkaline agent supply unit for supplying alkaline agent to at least upstream side of aftercooler in first impurity separator. Impurities in exhaust gas are discharged through drain including alkaline agent.

6 Claims, 4 Drawing Sheets

(51) Int. Cl.
 *B01D 53/75* (2006.01)
 *B01D 53/34* (2006.01)

(56) References Cited

U.S. PATENT DOCUMENTS

2012/0009107 A1* 1/2012 Petrocelli et al. ............. 423/235
2013/0319040 A1 12/2013 Naito

FOREIGN PATENT DOCUMENTS

JP 2012-143699 A 8/2012
WO WO 2012/107953 A1 8/2012

OTHER PUBLICATIONS

U.S. Appl. No. 14/662,446, filed Mar. 19, 2015, Naito.

* cited by examiner

COMPRESSOR IMPURITY-REMOVAL SYSTEM

TECHNICAL FIELD

The present invention relates to a compressor-based impurity removal system and specifically relates to a compressor-based impurity removal system adapted to remove impurities in exhaust gas from an oxyfuel combustor, using simple equipment.

BACKGROUND ART

Recently, an oxyfuel combustor has been studied as one of techniques for reducing emission of carbon dioxide ($CO_2$) which is said to be one of factors for global warming; and attention has been attracted to, for example, a coal-fired boiler for oxyfuel combustion of pulverized coal. It has been conceived in such coal-fired boiler that oxygen is used as an oxidizing agent in lieu of air to produce combustion exhaust gas mainly composed of carbon dioxide ($CO_2$) and such exhaust gas with high $CO_2$ concentration is compressed, cooled and recovered as liquefied carbon dioxide for disposal. It has been conceived as one of ways of disposal that the liquefied carbon dioxide is stored in the ground. Such exhaust-gas treatment system for a coal-fired boiler for oxyfuel combustion is disclosed in Patent Literature 1.

As shown in Patent Literature 1, the exhaust gas from the coal-fired boiler for oxyfuel combustion of coal is known to contain not only carbon dioxide ($CO_2$) but also impurities derived from coal feedstock such as nitrogen oxides ($NO_x$), sulfur oxides ($SO_x$), hydrargyrum (Hg), hydrogen chloride (HCl) and dust.

Among the above-mentioned impurities, sulfur oxides ($SO_x$) may be contacted with and dissolved in water into sulfuric acid ($H_2SO_4$), and hydrogen chloride (HCl) may be dissolved in water into hydrochloric acid. Thus, such water-soluble sulfur oxides and hydrogen chloride may be disunited through contact with water.

Meanwhile, among the nitrogen oxides ($NO_x$) as the above-mentioned impurities, nitrogen dioxide ($NO_2$) may be contacted with and dissolved in water into nitric acid ($HNO_3$); however, the exhaust gas from the coal-fired boiler has less oxygen ($O_2$) so that nitrogen exists substantially in the form of nitrogen monoxide (NO) which is water-insoluble and thus is unremovable by water spraying or the like.

The above-mentioned sulfuric acid, hydrochloric acid and nitric acid are known to have a problem of eroding equipment in the exhaust gas treatment device; and hydrargyrum, which is trace metal, is known to hurt low-temperatured aluminum members constituting a heat exchanger. It is thus preferable that these impurities in the exhaust gas are removed at early stages. There is also a problem that admixture of the impurities into the exhaust gas lowers a degree of purity of the carbon dioxide, which makes troublesome the liquefaction through compression and cooling and requires increase in size of equipment. It is further feared that any sulfur oxides admixed to the carbon dioxide liquefied and stored in the ground may cause a reaction of the same with calcium in the ground, leading to failure in sealability of the underground storage. Thus, in a coal-fired boiler for oxyfuel combustion or other system where an exhaust gas mainly composed of carbon dioxide is produced and the carbon dioxide is disposed, it is extremely important to remove impurities in the exhaust gas.

Thus, as shown in Patent Literature 1, it has been conducted in the coal-fired boiler or the like for oxyfuel combustion that a spray-column- or packed-column-type or other wet desulfurizer used in a conventional air-fired boiler or the like is provided to remove sulfur oxides. Moreover, nitrogen and nitrogen oxides derived from coal feedstock are produced in the exhaust gas from the coal-fired boiler for oxyfuel combustion or the like, so that it has been conducted that a catalyst-type or other denitrator is arranged upstream of the desulfurizer to remove the nitrogen and nitrogen oxides.

It is known in the wet desulfurizer as mentioned in the above that water-soluble sulfur oxides and hydrogen chloride as well as dust contained in the exhaust gas are removed and that nitrogen oxides are partly removed and hydrargyrum, which is inherently low in content, is slightly removed. It has been conceived that if hydrargyrum in the exhaust gas is still high in concentration even after the above-mentioned exhaust gas treatment is conducted, a hydrargyrum-removing column is arranged to remove the hydrargyrum by adsorbent or the like.

CITATION LIST

Patent Literature

[Patent Literature 1] JP 2010-172878A

SUMMARY OF INVENTION

Technical Problems

As shown in Patent Literature 1, in a conventional exhaust gas treatment system, an ordinary exhaust gas line is provided with both a spray- or packed-column type or other wet desulfurizer and a catalyst-based or other denitrator so as to remove impurities in the exhaust gas. However, greatness in amount (volume) of the exhaust gas to be dealt with brings about problems that the equipment for removal of impurities becomes extremely large in size and requires complication in structure, leading to increase in installation cost.

The invention was made in view of the above and has its object to provide a compressor-based impurity removal system which can effectively remove especially water-soluble impurities in exhaust gas from an oxyfuel combustor, using simple equipment, so as to reduce an installation cost.

Solution to Problems

The invention is directed to a compressor-based impurity removal system for removing impurities in exhaust gas mainly composed of carbon dioxide from an oxyfuel combustor before supply of the exhaust gas to a carbon dioxide liquefier, comprising a plurality of impurity separators comprising a plurality of compressors for compressing exhaust gas from the oxyfuel combustor stepwise to a target pressure for liquefaction of the exhaust gas, and aftercoolers for cooling the exhaust gas from the respective compressors, water condensed by the cooling being discharged as drain, and an alkaline agent supply unit for supplying an alkaline agent to at least an upstream side of the aftercooler in a first one of the impurity separators, the impurities in the exhaust gas being discharged through the drain containing the alkaline agent separated by the impurity separator.

Preferably, the compressor-based impurity removal system further comprises a drain tank for storing the drain from the aftercooler in the first impurity separator, a pH sensor for measuring a pH of the drain stored in said drain tank and a controller for controlling a supply of said alkaline agent by said alkaline agent supply unit on the basis of a pH value measured by said pH sensor.

Preferably, the compressor-based impurity removal system further comprises an impurity sensor downstream of the aftercooler in a last one of the impurity separators and said controller to which an impurity value detected by said impurity sensor is inputted, said controller being adapted to increase a supply of the alkaline agent by said alkaline agent supply unit when the impurity value detected by the impurity sensor exceeds a predetermined value.

In the compressor-based impurity removal system, an alkaline agent supply unit for supplying an alkaline agent may be arranged upstream of the aftercooler in any impurity separator subsequent to the first impurity separator.

Advantageous Effects of Invention

According to a compressor-based impurity removal system of the invention, an alkaline agent supply unit for supply of an alkaline agent is arranged upstream of an aftercooler in a first impurity separator having a compressor and an aftercooler so as to dissolve impurities in exhaust gas in drain for disposal. As a result, obtainable are excellent effects that especially water-soluble impurities in the exhaust gas are effectively removed, using compressors and aftercoolers required for liquefaction of carbon dioxide, with a result that increase in size and complication of equipment are prevented to substantially reduce an installation cost.

DESCRIPTION OF EMBODIMENTS

Embodiments of the invention will be described in conjunction with the attached drawings.

Figure 1:
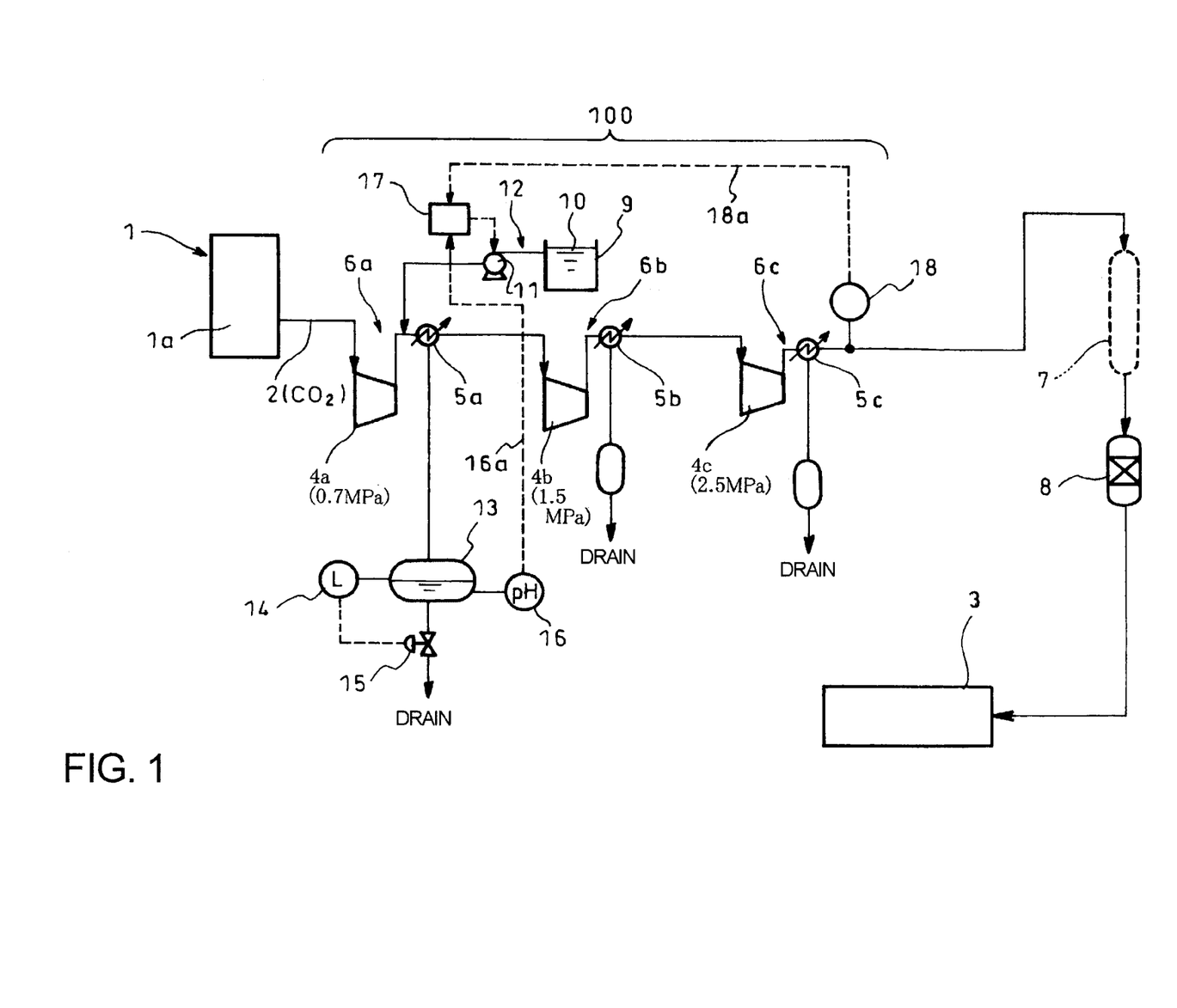
FIG. 1 is a systematic diagram showing an embodiment of a compressor-based impurity removal system according to the invention which is arranged for an oxyfuel combustor.

FIG. 1 is a systematic diagram showing one of the embodiments of a compressor-based impurity removal system 100 according to the invention which is arranged for an oxyfuel combustor 1. In FIG. 1, reference numeral 1 denotes the oxyfuel combustor comprising a coal-fired boiler 1a or the like for oxyfuel combustion of pulverized coal. Discharged from the oxyfuel combustor 1 is exhaust gas 2 mainly composed of carbon dioxide ($CO_2$). In order to supply such exhaust gas 2 mainly composed of carbon dioxide from the oxyfuel combustor 1 to a carbon dioxide liquefier 3 for liquefaction thereof, arranged upstream of the liquefier 3 is the compressor-based impurity removal system 100 adapted to compress the exhaust gas 2 up to a predetermined target pressure and remove impurities in the exhaust gas 2.

The compressor-based impurity removal system 100 shown in FIG. 1 comprises a plurality of (three in the embodiment illustrated) impurity separators 6a, 6b and 6c comprising a plurality of compressors 4a, 4b and 4c for compression of the exhaust gas 2 from the oxyfuel combustor 1 stepwisely up to the target pressure and aftercoolers 5a, 5b and 5c (coolers) for cooling of the exhaust gas 2 compressed in the respective compressors 4a, 4b and 4c to discharge water condensed by the cooling as drain. Generally, a cooler arranged between the compressors is called as intercooler; however, for ease of explanation, all of the coolers in the invention are explained as aftercoolers 5a, 5b and 5c.

Operations of the impurity separators 6a, 6b and 6c for liquefaction of carbon dioxide under various temperature and pressure conditions were studied to find out that a summed operational energy of the compressors and aftercoolers is lowest when carbon dioxide is increased in pressure up to 2.5 MPa and temperature is lowered to −30° C. prior to supply of the carbon dioxide to the carbon dioxide liquefier 3. Thus, 2.5 MPa is set as a target pressure. Here, 2.5 MPa set as the target pressure is a rough standard since temperatures and pressures set to the impurity separators 6a, 6b and 6c may vary depending on components, water content and carrying means (carrying vessel or the like) of the exhaust gas 2. Cooling below −40° C. requires an ammonia refrigerator since an alternative chlorofluorocarbon coolant in general is unusable at the temperature, which disadvantageously leads to increase in installation cost; thus, it is preferable that the cooling temperature by the aftercoolers 5 is set to on the order of −30° C.

Since the exhaust gas 2 cannot be pressurized up to the target pressure of 2.5 MPa all at once by a single compressor 4, the three compressors 4a, 4b and 4c are arranged according to the embodiment for three-step compressions into 0.75 MPa, 1.5 MPa and 2.5 MPa, thereby providing the impurity separators 6a, 6b and 6c. The number of the compressors 4a, 4b and 4c (the number of the impurity separators 6a, 6b and 6c) may be any including 4 or more.

In the first impurity separator 6a set to the above-mentioned pressure, almost all of the water in the exhaust gas 2 is discharged as drain; in the middle impurity separator 6b, a small amount of drain is discharged; and in the last impurity separator 6c, a further small amount of drain is discharged.

When a concentration of hydrargyrum (Hg) in the carbon dioxide having passed through the compressor-based impurity removal system 100 is higher than its target value, a hydrargyrum-removing column 7 is arranged to remove hydrargyrum, using an adsorbent or the like (the hydrargyrum-removing column 7 is shown in broken line in the drawings). Arranged upstream of the carbon dioxide liquefier 3 is a dryer 8 for removal of water in the carbon dioxide to be supplied to the carbon dioxide liquefier 3.

In the compressor-based impurity removal system 100 shown in FIG. 1, an alkaline agent supply unit 12 is arranged to supply an alkaline agent 10 in an alkaline agent tank 9 by a pump 11 to an entry (upstream) side of the aftercooler 5a in the first impurity separator 6a. The alkaline agent 10 usable is sodium hydroxide (NaOH), magnesium hydrate or the like which is highly dispersible and causes no fixation or the like. Alternatively, lime stone ($CaCO_3$), calcined lime (CaO), hydrated lime ($Ca(OH)_2$) or the like may be used when dispersibility can be maintained and a problem of fixation or the like can be solved. The entry side adjacent to the aftercooler 5a may be used as a supply position of the alkaline agent 10 by the alkaline agent supply unit 12. Alternatively, the alkaline agent may be supplied by the alkaline agent supply unit 12 to any position between the aftercooler 5a and the compressor 4a upstream of the aftercooler 5a.

Further, the first impurity separator 6a is provided with a drain tank 13 for storing of a constant amount of drain from the aftercooler 5a. The drain tank 13 is provided with a level controller 14 which controls an opening degree of a discharge valve 15 arranged on a drain discharge (downstream) side of the tank 13 so as to keep a detection value always constant.

The drain tank 13 is further provided with a pH sensor 16 for measurement of a pH in the drain stored, and a pH value 16a detected by the pH sensor 16 is inputted to a controller 17 which controls the pump 11 to keep the pH value 16a detected by the pH sensor 16 to a predetermined value to thereby control a supply of the alkaline agent 10 by the alkaline agent supply unit 12.

Arranged on an exit (downstream) side of the aftercooler 5c in the last impurity separator 6c where the exhaust gas 2 is discharged is an impurity sensor 18 for detection of impurities (e.g., nitrogen oxides or hydrogen chloride) in the exhaust gas 2, and an impurity value 18a detected by the impurity sensor 18 is inputted to the controller 17 which in turn conducts an emergency control to increase the supply of the alkaline agent 10 by the alkaline agent supply unit 12 when the impurity (e.g. nitrogen oxides or hydrogen chloride) value 18a detected by the impurity sensor 18 exceeds a predetermined value. The exit side of the aftercooler 5c is most preferable as a position of the impurity sensor 18 for quick detection of the impurities in the drain; alternatively, it may be arranged at any position downstream of the aftercooler 5c and between the aftercooler 5c and the dryer 8 (or the hydrargyrum-removing column 7).

The compressor 4a in the first impurity separator 6a, which is supplied with the exhaust gas 2 containing impurities from the oxyfuel combustor 1 and thus has a concern of being corroded, is preferably made of an anticorrosive material such as HASTELLOY (registered trademark). Here, the anticorrosive material is not restricted to heat-resistive nickel alloys, but may be constituted by any other metal, alloy or inorganic substance provided that the material has corrosion- and heat-resistance. The compressor 4a may be a compressor with blades (vanes) or a gear-driven turbocharger-based compressor without blades.

Next, mode of operation of the above embodiment will be described.

The exhaust gas 2 mainly composed of carbon dioxide from the oxyfuel combustor 1 is guided with a pressure of, for example, 0.1 MPa (one atmosphere of pressure) to the compressor 4a in the first impurity separator 6a in the impurity removal system 100, and is pressurized by the compressor 4a to 0.7 MPa. The exhaust gas 2 pressurized by the compressor 4a to 0.7 MPa is supplied, together with the alkaline agent 10 from the alkaline agent supply unit 12, to and cooled by the adjacent aftercooler 5a from which drain produced in large quantity by the cooling is discharged together with the alkaline agent 10 to the drain tank 13.

The first impurity separator 6a is a section where the drain is produced most owing to the compression by the compressor 4a and the cooling by the aftercooler 5a, and a pH value thereof is enhanced by supplying the alkaline agent 10 to the upstream side of the aftercooler 5c in the first impurity separator 6a. Thus, especially sulfur oxides and hydrogen chloride which are water-soluble impurities in the exhaust gas 2 are enhanced in dissolving thereof into the drain and thus are effectively removed. Here, the pH of the drain in the drain tank 13 may be set approximately within a range of 4-6. Further, the compression by the compressor 4a converts part of nitrogen into nitrogen oxides which are water-soluble and are dissolved in and removed together with the drain.

The exhaust gas 2 discharged from the first impurity separator 6a is guided to the succeeding impurity separator 6b. However, the exhaust gas 2 still has a part of the alkaline agent 10 which has not been reacted. As a result, also in the succeeding impurity separator 6b, impurities are removed together with a small amount of drain; and further, the exhaust gas 2 is guided to the last impurity separator 6c where impurities are removed together with a further small amount of drain. The drain including the impurities is supplied to a drainage treatment device for disposal.

Here, supply of the alkaline agent 10 to the upstream side of the aftercooler 5a in the first impurity separator 6a enhances the pH of the exhaust gas 2, so that the material of the compressors 4b and 4c in the succeeding impurity separators 6b and 6c can be protected from corrosive environment.

The inventors conducted simulation tests to find out a relationship between an additive amount (kg/hr) of an alkaline agent (NaOH) and a removal ratio of sulfur oxides ($SO_2$) in the first impurity separator 6a. The result is shown in FIG. 4.

Figure 4:
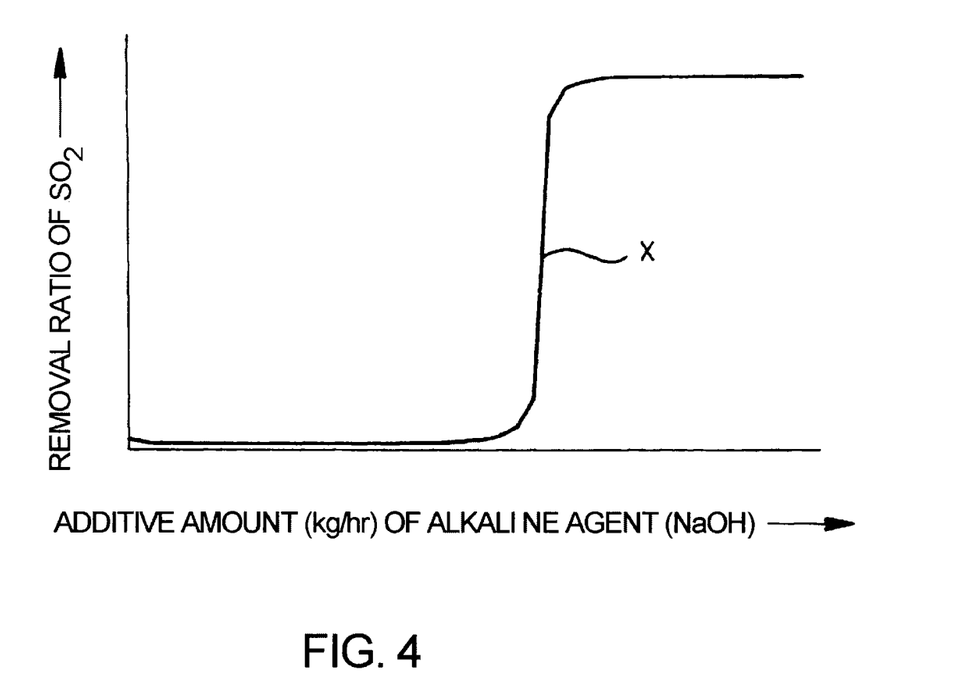
FIG. 4 is a diagram showing a relationship between an additive amount of an alkaline agent supplied upstream of an aftercooler in a first impurity separator and a removal ratio of sulfur oxides.

As shown in FIG. 4, in the above tests, the removal ratio of the sulfur oxides is more or less 2% when the additive amount of the alkaline agent is a few. However, it was turned out that the removal ratio of the sulfur oxides abruptly increases when the additive amount of the alkaline agent is increased up to more or less 2.4 (kg/hr), and increases up to about 98% when the additive amount is more or less 2.7 (kg/hr). It is conjectured that this tendency of the removal ratio of the sulfur oxides is also applied to hydrogen chloride.

Thus, as mentioned in the above, preliminarily measured are the additive amount of the alkaline agent 10 and the pH of the drain tank 13 when the removal ratio of the sulfur oxides abruptly increases to a higher value. And in an actual operation, the supply of the alkaline agent 10 by the alkaline agent supply unit 12 is controlled so as to keep the preliminarily measured pH, so that the water-soluble impurities including especially highly corrosive sulfur oxides and hydrogen chloride are effectively removed with an extremely high removal ratio.

Further, in the succeeding impurity separators 6b and 6c, the remaining sulfur oxides and hydrogen chloride are removed together with the drain, so that the removal ratio of sulfur oxides and hydrogen chloride is further enhanced.

The pressure of the exhaust gas 2 is enhanced stepwisely by the impurity separators 6a, 6b and 6c, so that oxidization of nitrogen in the exhaust gas 2 is accelerated into water-soluble nitrogen oxides due to the increase in pressure. Thus, the more the drain proceeds to the succeeding impurity separators 6b and 6c, the more the nitrogen oxides are discharged together with the drain, leading to removal of the nitrogen oxides.

As mentioned in the above, the carbon dioxide made free from impurities in the exhaust gas 2 by the compressor-based impurity removal system 100 is made free from hydrargyrum by the hydrargyrum-removing column 7 as needs demand, is supplied to the dryer 8 for removal of water and then is supplied to and liquefied through cooling by the carbon dioxide liquefier 3.

Figure 2:
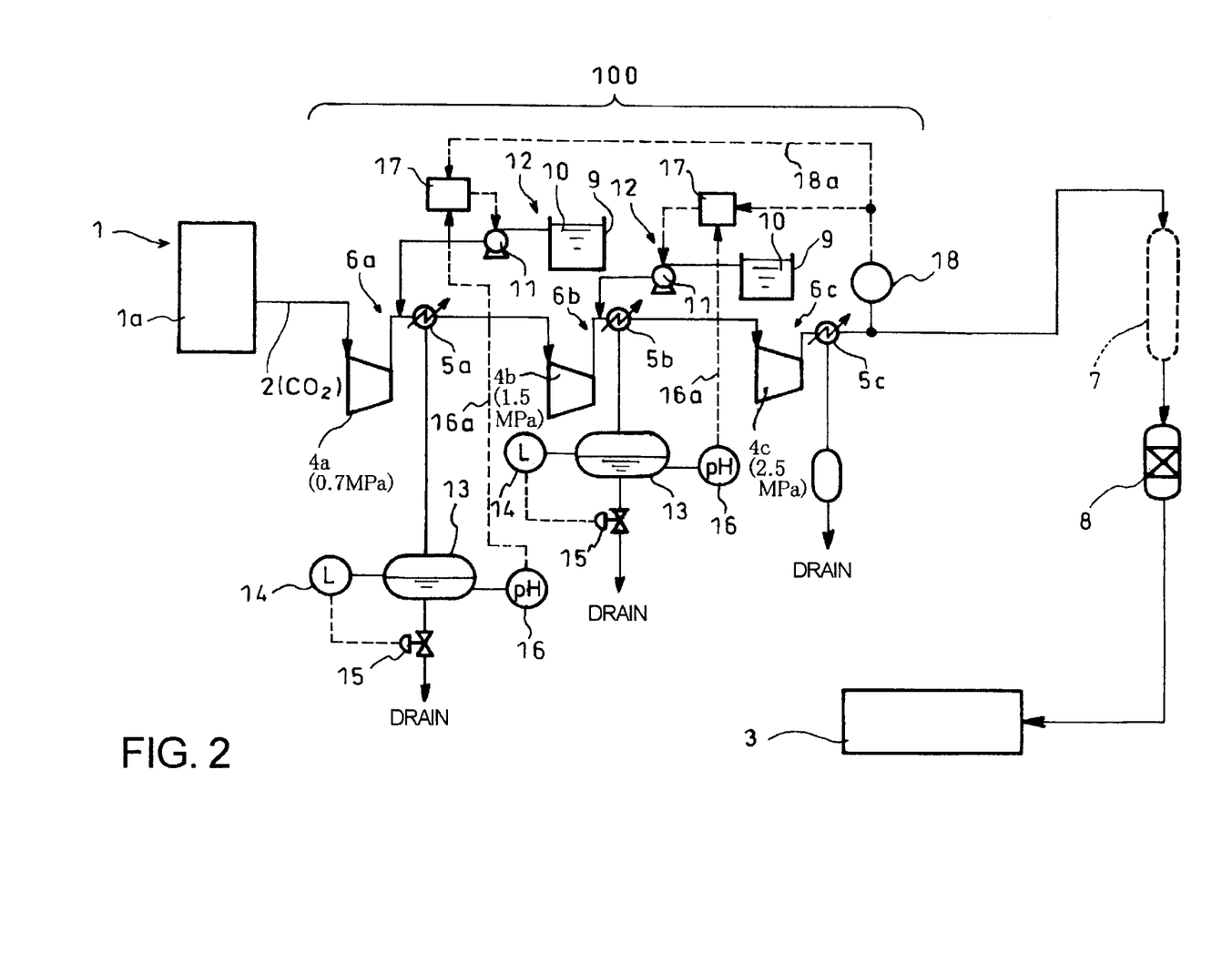
FIG. 2 is a systematic diagram showing a further embodiment of the compressor-based purity removal system according to the invention.

FIG. 2 is a systematic diagram showing a further embodiment of the compressor-based impurity removal system in the invention. In this embodiment, the alkaline agent supply unit 12, the drain tank 13 and the controller 17 which are the same as those arranged for the first impurity separator 6a are arranged for the succeeding impurity separator 6b downstream of the first impurity separator 6a.

According to the FIG. 2 embodiment, the impurity removal ratio in the succeeding impurity separator 6b is enhanced, so that the impurity removal ratio is further enhanced in comparison with that of the FIG. 1 embodiment. The construction of the above-mentioned alkaline agent supply unit 12, drain tank 13 and controller 17 may be arranged for the still further succeeding (last) impurity separator 6c downstream of the succeeding impurity separator 6b.

Figure 3:
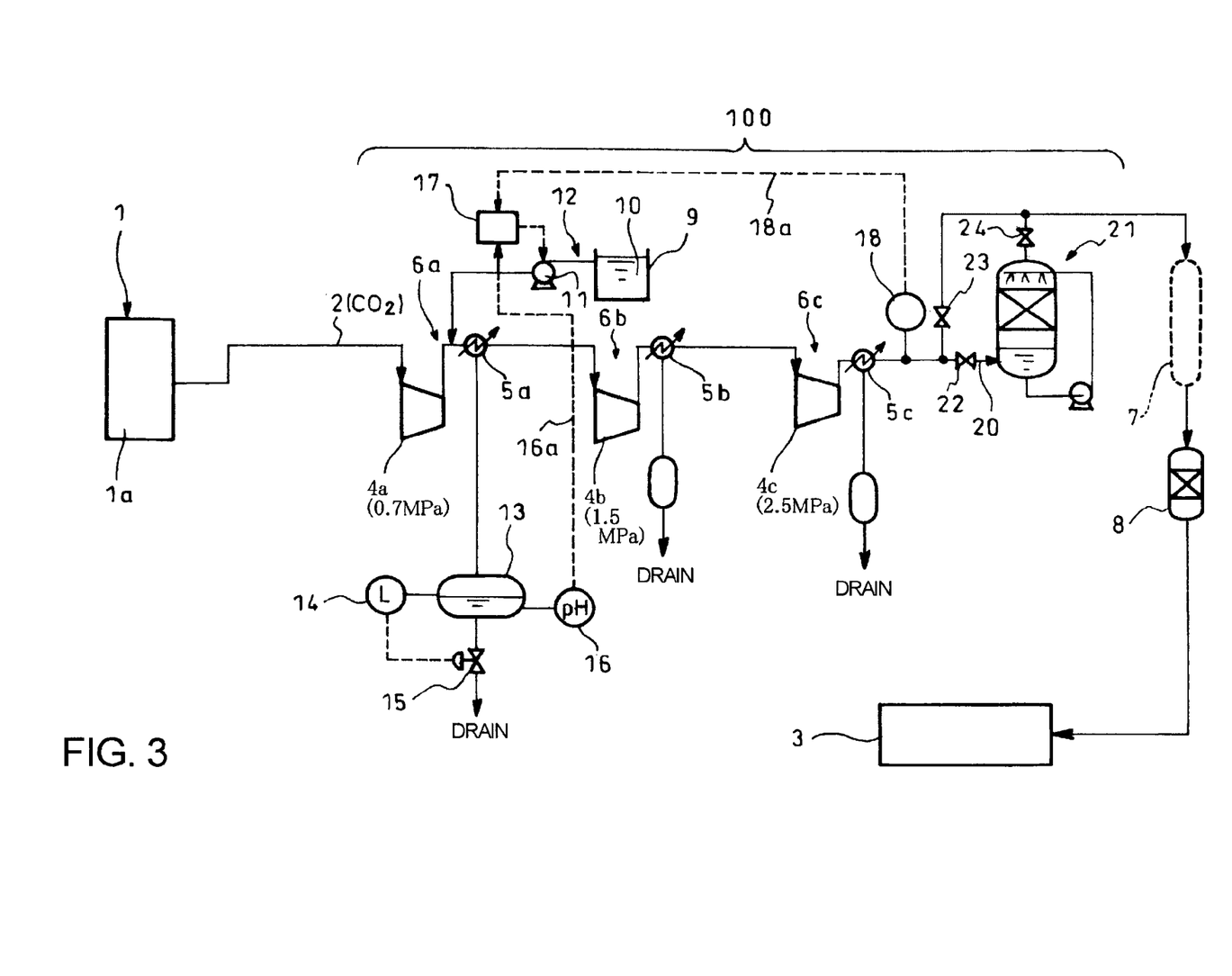
FIG. 3 is a systematic diagram showing a modification of the compressor-based impurity removal system according to the invention.

FIG. 3 is a systematic diagram showing a modification of the compressor-based impurities removal system according to the invention. In this modification, a bypass duct 20 is arranged on an exit side of the last impurity separator 6c which is at downstream in the compressor-based impurity removal system 100. The bypass duct 20 is provided with a wet desulfurization and denitration device 21 and further with changeover valves 22, 23 and 24 for changeover between flowing and non-flowing states of the exhaust gas 2 to the desulfurization and denitration device 21.

With the bypass duct 20 being provided with the desulfurization and denitration device 21, the exhaust gas 2 may be supplied to the desulfurization and denitration device 21 as needs demand, whereby impurities in the exhaust gas may be further reduced. In this case, a flow rate of the exhaust gas 2 guided from the compressor-based impurity removal system 100 is extremely trifle because of compression by the respective compressors 4a, 4b and 4c in the compressor-based impurity removal system 100, so that the desulfurization and denitration device 21 used may be extremely small-sized (reduced in size to about one-several tenths in comparison with a conventional device).

As mentioned in the above, in the compressor-based impurity removal system 100 according to the invention, the alkaline agent supply unit 12 is provided to supply the alkaline agent 10 to the upstream side of the aftercooler 5a in the first impurity separator 6a so that impurities in the exhaust gas 2 can be effectively removed, using the compressors 4 and aftercoolers 5 required for liquefaction of carbon dioxide, resulting in prevention of the equipment from being increased in size and complicated in structure and thus substantial reduction in installation cost.

In the compressor-based impurity removal system 100 according to the invention, provision of the drain tank 13 for storing of the drain from the aftercooler 5c in the last impurity separator 6c, the pH sensor 16 for measurement of the pH in the drain stored in the drain tank 13 and the controller 17 for control of the supply of the alkaline agent 10 by the alkaline agent supply unit 12 on the basis of the pH value 16a detected by the pH sensor 16 can properly control the supply of the alkaline agent 10 to remove impurities in the exhaust gas 2 further effectively. And, the proper control of the amount of the alkaline agent 10 used can suppress the cost incurred.

In the compressor-based impurity removal system 100 according to the invention, if the impurity sensor 18 is provided on the downstream side of the aftercooler 5c in the last impurity separator 6c and the controller 17 is provided to which impurity value 18a detected by the impurity sensor 18 is inputted, then the controller 17 can control to increase the supply of the alkaline agent 10 by the alkaline agent supply unit 12 when the impurity value 18a detected by the impurity sensor 18 exceeds a predetermined value. Thus, the impurities in the exhaust gas 2 passed through the compressor-based impurity removal system 100 can be prevented from being abruptly increased.

In the compressor-based impurity removal system 100 of the invention, provision of the alkaline agent supply units 12 for supply of the alkaline agent 10 to the upstream side of the aftercoolers 5b and 5c in the impurity separators 6b and 6c, respectively, downstream of the first impurity separator 6a can not only remove almost all of the water-soluble impurities but also convert the nitrogen, which is water-insoluble impurity, into nitrogen oxides and remove the same with high removal ratio.

In the compressor-based impurity removal system 100 of the invention, the alkaline agent 10 is supplied to the exhaust gas 2 at the position where the drain is produced most due to the compression and cooling by the compressor 4a and aftercooler 5a in the first impurity separator 6a, so that sulfur oxides and hydrogen chloride which are the water-soluble impurities can be removed at extremely high removal ratio, using simple installation.

In the compressor-based impurity removal system 100 according to the invention, supply of the alkaline agent 10 to the upstream side of the aftercooler 5a in the first impurity separator 6a enhances the pH of the exhaust gas 2, which can protect the material of the compressors 4b and 4c in the succeeding impurity separators 6b and 6c from corrosive environment.

It is to be understood that a compressor-based impurity removal system according to the invention is not limited to the above embodiments and that various changes and modifications may be made without departing from the scope of the invention.

INDUSTRIAL APPLICABILITY

A compressor-based impurity removal system according to the invention is applicable to an oxyfuel combustor which discharges exhaust gas containing water-soluble impurities.

REFERENCE SIGNS LIST 1 oxyfuel combustor
1a coal-fired boiler (oxyfuel combustor)
2 exhaust gas
3 carbon dioxide liquefier
4 compressor
4a, 4b, 4c compressor
5 aftercooler
5a, 5b, 5c aftercooler
6a, 6b, 6c impurity separator
10 alkaline agent
12 alkaline agent supply unit
13 drain tank
16 pH sensor
16a pH value detected
17 controller
18 impurity sensor
18a impurity value detected
100 compressor-based impurity removal system

The invention claimed is:

1. A compressor-based impurity removal system for removing impurities in exhaust gas mainly composed of carbon dioxide from an oxyfuel combustor before supply of the exhaust gas to a carbon dioxide liquefier, comprising a plurality of impurity separators comprising a plurality of compressors for compressing exhaust gas from the oxyfuel combustor stepwisely to a target pressure for liquefaction of the exhaust gas, and aftercoolers for cooling the exhaust gas from the respective compressors, water condensed by the cooling being discharged as drain, and an alkaline agent supply unit for supplying an alkaline agent to at least an upstream side of the aftercooler in a first one of the impurity separators, the impurities in the exhaust gas being discharged through the drain containing the alkaline agent separated by the impurity separator.

2. The compressor-based impurity removal system as claimed in claim 1 wherein an alkaline agent supply unit for supplying an alkaline agent is arranged upstream of the aftercooler in any impurity separator subsequent to the first impurity separator.

3. The compressor-based impurity removal system as claimed in claim 1, further comprising a drain tank for storing the drain from the aftercooler in the first impurity separator, a pH sensor for measuring a pH of the drain stored in said drain tank and a controller for controlling a supply of said alkaline agent by said alkaline agent supply unit on the basis of a pH value measured by said pH sensor.

4. The compressor-based impurity removal system as claimed in claim 3 wherein an alkaline agent supply unit for supplying an alkaline agent is arranged upstream of the aftercooler in any impurity separator subsequent to the first impurity separator.

5. The compressor-based impurity removal system as claimed in claim 3, further comprising an impurity sensor downstream of the aftercooler in a last one of the impurity separators and said controller to which an impurity value detected by said impurity sensor is inputted, said controller being adapted to increase a supply of the alkaline agent by said alkaline agent supply unit when the impurity value detected by the impurity sensor exceeds a predetermined value.

6. The compressor-based impurity removal system as claimed in claim 5 wherein an alkaline agent supply unit for supplying an alkaline agent is arranged upstream of the aftercooler in any impurity separator subsequent to the first impurity separator.

* * * * *